(12) United States Patent
Furuta

(10) Patent No.: US 11,814,120 B2
(45) Date of Patent: Nov. 14, 2023

(54) DATA PROCESSING DEVICE AND DATA PROCESSING SYSTEM

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 17/321,809

(22) Filed: May 17, 2021

(65) Prior Publication Data

US 2021/0387670 A1 Dec. 16, 2021

(30) Foreign Application Priority Data

Jun. 16, 2020 (JP) ................................ 2020-103851

(51) Int. Cl.
*B62D 6/00* (2006.01)
*B60W 30/18* (2012.01)

(52) U.S. Cl.
CPC ........ *B62D 6/006* (2013.01); *B60W 30/18009* (2013.01); *B60W 2552/20* (2020.02); *B60W 2552/35* (2020.02)

(58) Field of Classification Search
CPC ............ B62D 6/006; B60W 30/18009; B60W 2552/20; B60W 2552/35
See application file for complete search history.

(56) References Cited

U.S. PATENT DOCUMENTS

| | | | |
|---|---|---|---|
| 2010/0324780 A1 | 12/2010 | Koumura et al. | |
| 2013/0116972 A1* | 5/2013 | Hanatsuka | G01B 17/08 |
| | | | 702/167 |
| 2014/0336842 A1* | 11/2014 | Jang | G06V 20/58 |
| | | | 701/1 |
| 2017/0166019 A1* | 6/2017 | Singh | B60C 23/0408 |
| 2017/0320368 A1 | 11/2017 | Masamura | |

(Continued)

FOREIGN PATENT DOCUMENTS

| | | |
|---|---|---|
| CN | 103003110 A | 3/2013 |
| CN | 107750364 A | 3/2018 |

(Continued)

*Primary Examiner* — Khoi H Tran
*Assistant Examiner* — Tristan J Greiner
(74) *Attorney, Agent, or Firm* — Dinsmore & Shohl LLP

(57) ABSTRACT

A data processing system including a data processing apparatus that can generate an accurate road surface displacement correlating value that is used for a preview damping control is provided. The system includes a cloud having a data processing section and a processing-data-base-section for temporally storing data. The data processing apparatus stores sensing data in the processing-data-base-section, wherein the sensing data is a chunk of sensor values from which a road surface displacement correlating value correlating with a vertical displacement of a road surface on which said vehicle is traveling can be calculated. The sensor values are sequentially and successively detected/obtained by various sensors of the vehicle. The data processing section performs specific offline data processing for a chunk of the sensing data stored in the processing-data-base-section so as to generate data of the road surface displacement correlating value from the sensing data.

2 Claims, 10 Drawing Sheets

(56) References Cited

U.S. PATENT DOCUMENTS

| | | | | |
|---|---|---|---|---|
| 2019/0034739 A1* | 1/2019 | Stein | ................... | G06T 7/60 |
| 2019/0359219 A1* | 11/2019 | Isshiki | ................ | B60W 40/06 |
| 2022/0009502 A1* | 1/2022 | Yokoyama | ............ | G06T 7/0004 |

FOREIGN PATENT DOCUMENTS

| | | |
|---|---|---|
| JP | H07215032 A | 8/1995 |
| JP | H07-276952 A | 10/1995 |
| JP | 2009-096366 A | 5/2009 |
| JP | 2016-045063 A | 4/2016 |
| JP | 2016-088360 A | 5/2016 |
| JP | 2016-107778 A | 6/2016 |
| JP | 2020-016541 A | 1/2020 |
| WO | 2016/135736 A2 | 9/2016 |

\* cited by examiner

DATA PROCESSING DEVICE AND DATA PROCESSING SYSTEM

CROSS-REFERENCE TO RELATED APPLICATION

This application claims priority to Japanese Patent Application No. JP 2020-103851 filed on Jun. 16, 2020, the content of which is hereby incorporated by reference in its entirety into this application.

TECHNICAL FIELD

The present disclosure relates to a data processing device and a data processing system, to process data of sensor values detected by various sensors that a vehicle has, in order to generate data of road surface displacement correlating value that relates to a road surface vertical displacement, for a preview damping control of the vehicle.

BACKGROUND

A suspension control apparatus (hereinafter, referred to as a "conventional apparatus") disclosed in Japanese Patent Application Laid-Open No. H7-215032 obtains sensor values, detected by a preview sensor and a vehicle body vertical direction acceleration sensor, and processes data of the obtained sensor values in real time (i.e., by a real time data processing).

The conventional apparatus calculates a road surface inference value representing a state of a road surface at a preview point (preview position) by the real time data processing. The road surface inference value is used for the preview damping control of the vehicle.

SUMMARY

The conventional apparatus performs the real time data processing such as a real time integration processing and a filtering processing. Therefore, an error in the integration and/or a phase shifting may be included in the data of the road surface inference value representing the state of the road surface at the preview point (preview position). Thus, accuracy of the road surface inference value at the preview point may be degraded. If the preview damping control is performed using the inaccurate road surface inference value, the effect of the preview damping control is decreased.

The present disclosure is made to cope with the problem described above. One of objectives of the present disclosure is to provide a data processing device and a data processing system that are capable of generating/obtaining highly accurate road surface displacement correlating value used for the preview damping control.

A data processing apparatus of the present disclosure may be referred to as a "present disclosed data processing apparatus", and a data processing system of the present disclosure may be referred to as a "present disclosed data processing system".

The present disclosed data processing apparatus comprises:
a processing data storing device/section that stores data; and
a data processing device/section.
The data processing device/section is configured to:
obtain sensor values from information obtaining device mounted on a vehicle that (sequentially and successively) acquires the sensor values, the sensor values being ones from which a road surface displacement correlating value correlating with a vertical displacement of a road surface on which the vehicle is traveling can be calculated;
store sensing data that is a set of the obtained sensor values in the processing data storing device; and
perform specific offline data processing for a chunk of the sensing data stored in the processing data storing device so as to generate data of the road surface displacement correlating value.

Since the data processing device/section is configured to perform specific offline data processing for a chunk of the sensing data in the present disclosed data processing apparatus, data of the highly accurate road surface displacement correlating value (i.e., the data that can enhance the damping ability of the preview damping control when the data is used for the preview damping control) can be generated from the sensing data.

In some embodiments of the present disclosed data processing apparatus, a data accumulating device that stores data other than the sensing data is included.

In this case, the data processing device is configured to store the generated data of the road surface displacement correlating value in the data accumulating device.

Therefore, the present disclosed data processing apparatus can store/accumulate the data of the highly accurate road surface displacement correlating value (i.e., the data that can enhance the damping ability of the preview damping control when the data is used for the preview damping control) in the data accumulating device. The data stored in the data accumulating device may be transmitted through a communication link (e.g., an internet) to a vehicle that performs the preview damping control using the transmitted data.

In some embodiments of the above present disclosed data processing apparatus,
the processing data storing device, the data processing device, and the data accumulating device are located outside of the vehicle; and
the data processing device is configured to obtain the sensor values from the information obtaining device through a communication link.

In the above embodiment, the sensing data is processed by the data processing device that is connected to a network (the communication link). Thus, the offline processing by the data processing device is possible so that the highly accurate road surface displacement correlating value (i.e., the data that can enhance the damping ability of the preview damping control when the data is used for the preview damping control) can be generated and be stored in the data accumulating device.

In the above embodiment, the road surface displacement correlating value is at least one of:
an unsprung mass displacement representing (indicative of) a vertical displacement of an unsprung mass of the vehicle;
an unsprung mass displacement rate that is a time derivative value of the unsprung mass displacement;
a road surface displacement representing (indicative of) a vertical displacement of the road surface; and
a road surface displacement rate that is a time derivative value of the road surface road surface displacement.

By the above embodiment, at least one of "the unsprung mass displacement, the unsprung mass displacement rate, the road surface displacement, and the road surface displacement rate", that is highly accurate road surface displacement correlating value used for the preview damping control (i.e., the data that can enhance the damping ability of the preview damping control when the data is used for the preview damping control), can be generated through the specific offline data processing.

In some embodiments of the above present disclosed data processing apparatus, the sensor values include at least one of:

a vertical direction acceleration of a sprung mass of the vehicle;

a relative vertical displacement between the sprung mass and the unsprung mass;

a relative vertical displacement between a vehicle body of the vehicle and the road surface;

a vertical displacement of the road surface; and an acceleration of the unsprung mass, and the specific offline data processing includes at least one of:

a process for differentiating;

a process for integrating;

a process for subtracting;

a process for extrapolating using an observer; and a process for filtering that allows components having frequencies within a particular frequency band to pass through.

By the above embodiment, at least one of "the unsprung mass displacement, the unsprung mass displacement rate, the road surface displacement, and the road surface displacement rate", that is highly accurate road surface displacement correlating value used for the preview damping control (i.e., the data that can enhance the damping ability of the preview damping control when the data is used for the preview damping control), can be generated through at least one of the process for differentiating, the process for integrating, the process for subtracting, the process for extrapolating using the observer; and the process for filtering that allows components having frequencies within the particular frequency band to pass through.

In some embodiments of the above present disclosed data processing apparatus, the road surface displacement correlating value is an unsprung mass displacement representing a vertical displacement of an unsprung mass of the vehicle;

the sensor values include a vertical direction acceleration of a sprung mass of the vehicle and a relative vertical displacement between the sprung mass and the unsprung mass; and the specific offline data processing includes:

a process for second-order-integrating the vertical direction acceleration of the sprung mass so as to generate data of a sprung mass displacement representing a vertical displacement of the sprung mass from data of the vertical direction acceleration of the sprung mass;

a process for filtering that allows components of the generated data of the sprung mass displacement having frequencies within a particular frequency band to pass through so as to generate post processed sprung mass displacement data;

a process for filtering that allows components of data of the relative vertical displacement between the sprung mass and the unsprung mass having frequencies within the particular frequency band to pass through so as to generate post processed relative vertical displacement data; and a process for calculating the unsprung mass displacement based on the generated post processed sprung mass displacement data and the generated post processed relative vertical displacement data.

By the above embodiment, the unsprung mass displacement that is highly accurate (i.e., the data that can enhance the damping ability of the preview damping control when the data is used for the preview damping control), can be generated through the specific offline data processing.

The particular frequency band described above is a predetermined band within which sprung mass resonance frequency falls.

When the particular frequency band is set as above, the data of the more accurate road surface displacement correlating value (i.e., the data from which an error caused by low frequency components is eliminated) can be generated.

The present disclosed data processing system comprises:

information obtaining device, mounted on a vehicle, that sequentially and successively acquires sensor values from which "a road surface displacement correlating value correlating with a vertical displacement of a road surface on which the vehicle is traveling" can be calculated; and a data processing apparatus that obtains the sensor values from the information obtaining device through a communication link and stores the obtained sensor values.

Furthermore, the data processing apparatus is configured to:

store the sensor values; and perform specific offline data processing for a certain amount of sensing data that is a chunk of the stored sensor values so as to generate data of the road surface displacement correlating value from the sensing data.

In the present disclosed data processing system, since the data processing device/section is configured to perform the specific offline data processing for a chunk of the sensing data, the data of the highly accurate road surface displacement correlating value (i.e., the data that can enhance the damping ability of the preview damping control when the data is used for the preview damping control) can be generated from the sensing data.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols.

DETAILED DESCRIPTION

<Configuration>

Figure 1:
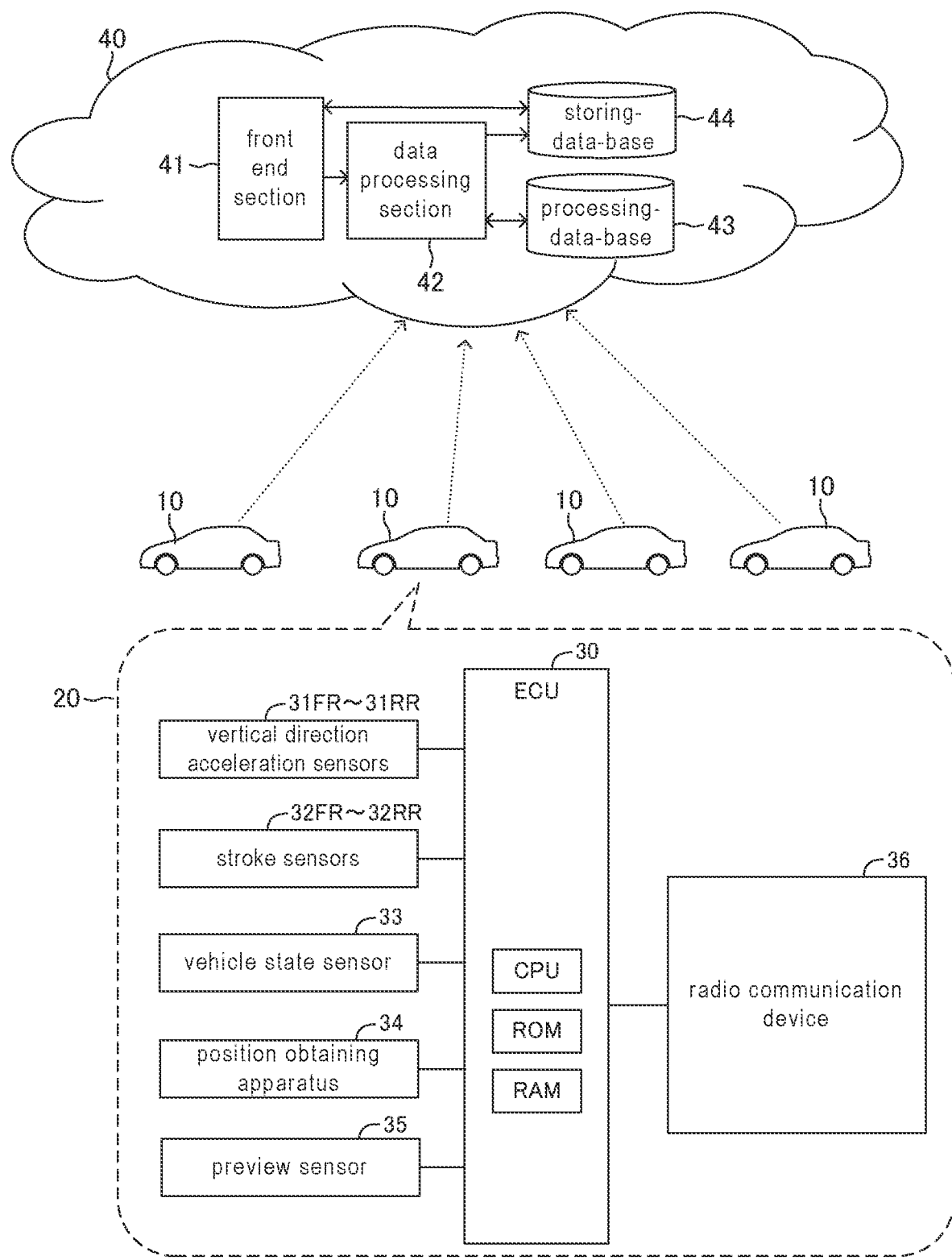
FIG. 1 is a schematic diagram of a data processing system including a data processing apparatus according to an embodiment of the present disclosure.

FIG. 1 illustrates a data processing system that includes a data processing apparatus (cloud 40). The data processing system includes not only the cloud 40 but also a plurality of vehicles 10 each having a data collecting apparatus 20. For illustrative purposes, FIG. 1 includes only four of the vehicles 10 as the plurality of the vehicles 10.

Figure 2:
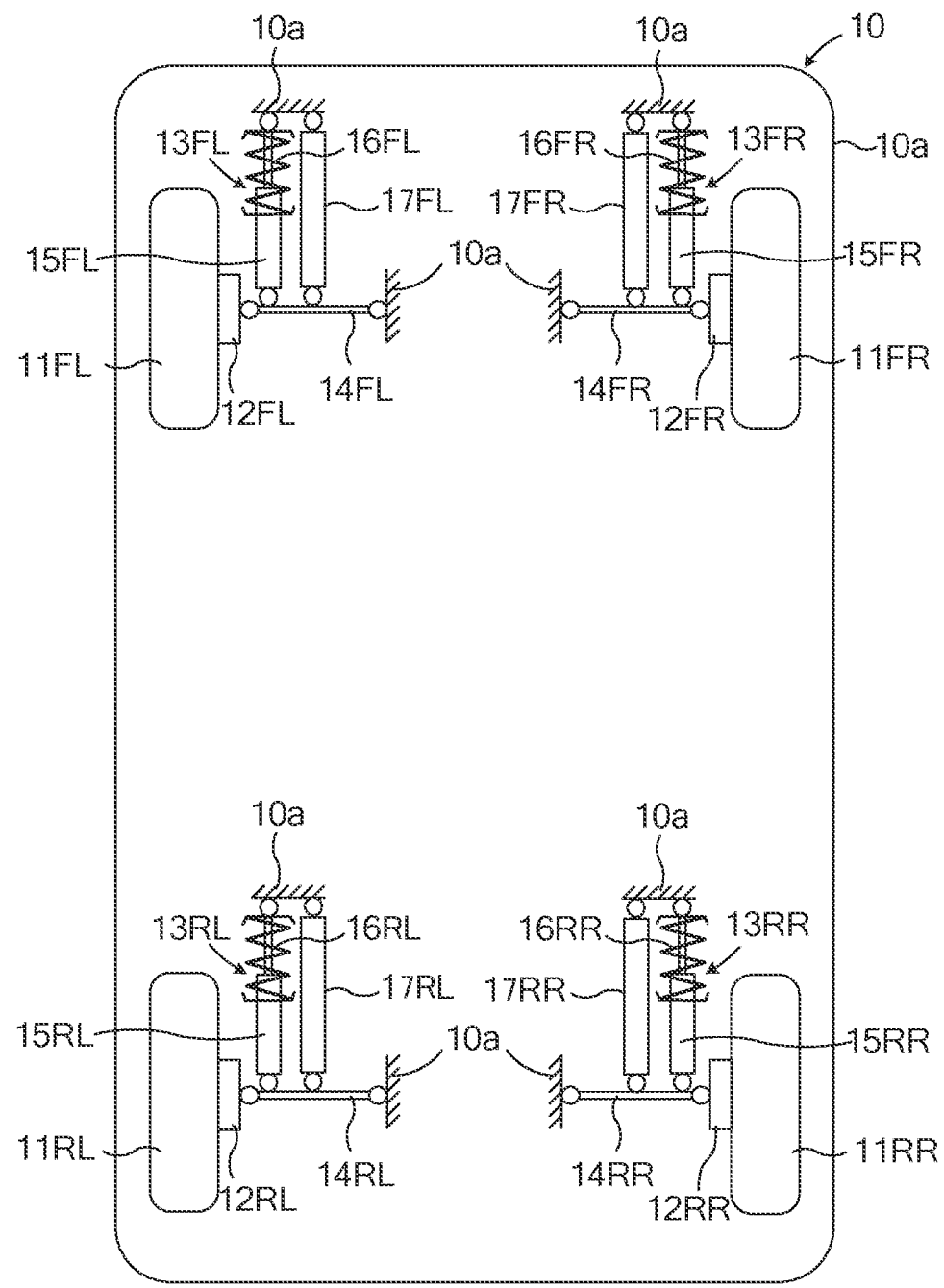
FIG. 2 is a schematic diagram of the vehicle show in FIG. 1.

As shown in FIG. 2, the vehicle 10 comprises a front left wheel 11FL, a front right wheel 11FR, a rear left wheel 11RL, and a rear right wheel 11RR. The front left wheel 11FL is rotatably supported by a wheel supporting member 12FL. The front right wheel 11FR is rotatably supported by a wheel supporting member 12FR. The rear left wheel 11RL is rotatably supported by a wheel supporting member 12RL. The rear right wheel 11RR is rotatably supported by a wheel supporting member 12RR.

The front left wheel 11FL, the front right wheel 11FR, the rear left wheel 11RL, and the rear right wheel 11RR are sometimes referred to as "the wheels 11FL-11RR". When the front left wheel 11FL, the front right wheel 11FR, the rear left wheel 11RL, and the rear right wheel 11RR need not be distinguished from each other, each of them is sometimes referred to as a "wheel 11". When the front left wheel 11FL and the front right wheel 11FR need not be distinguished from each other, each of them is sometimes referred to as a "front wheel 11F". When the rear left wheel 11RL and the rear right wheel 11RR need not be distinguished from each other, each of them is sometimes referred to as a "rear wheel 11R". When the wheel supporting members 12FL-12RR need not be distinguished from each other, each of them is sometimes referred to as a "wheel supporting member 12".

The vehicle 10 further comprises a front left suspension 13FL, a front right suspension 13FR, a rear left suspension 13RL, and a rear right suspension 13RR.

The front left suspension 13FL includes a suspension arm 14FL, a shock absorber 15FL, and a suspension spring 16FL, to suspend the front left wheel 11FL from a vehicle body 10a.

The front right suspension 13FR includes a suspension arm 14FR, a shock absorber 15FR, and a suspension spring 16FR, to suspend the front right wheel 11FR from the vehicle body 10a.

The rear left suspension 13RL includes a suspension arm 14RL, a shock absorber 15RL, and a suspension spring 16RL, to suspend the rear left wheel 11RL from the vehicle body 10a.

The rear right suspension 13RR includes a suspension arm 14RR, a shock absorber 15RR, and a suspension spring 16RR, to suspend the rear right wheel 11RR from the vehicle body 10a.

The front left suspension 13FL, the front right suspension 13FR, the rear left suspension 13RL, and the rear right suspension 13RR are sometimes referred to as "the suspensions 13FL-13RR". When the front left suspension 13FL, the front right suspension 13FR, the rear left suspension 13RL, and the rear right suspension 13RR need not be distinguished from each other, each of them is sometimes referred to as a "suspension 13". When the suspension arms 14FL-14RR need not be distinguished from each other, each of them is sometimes referred to as a "suspension arm 14".

When the shock absorbers 15FL-15RR need not be distinguished from each other, each of them is sometimes referred to as a "shock absorber 15". When the suspension springs 16FL-16RR need not be distinguished from each other, each of them is sometimes referred to as a "suspension spring 16".

The suspension arm 14 is connected to the wheel supporting member 12 that supports the wheel 11. It should be noted that, although only one suspension arm 14 is illustrated per one suspension 13 in FIG. 1, a plurality of the suspension arms 14 may be provided per one suspension 13.

The shock absorber 15 is disposed between the vehicle body 10a and the suspension arm 14. An upper end of the shock absorber 15 is connected to the vehicle body 10a. A lower end of the shock absorber 15 is connected to the suspension arm 14. The suspension spring 16 is elastically disposed between the vehicle body 10a and the suspension arm 14 through the shock absorber 15. Namely, an upper end of the suspension spring 16 is connected to the vehicle body 10a. A lower end of the suspension spring 16 is connected to a cylinder of the shock absorber 15. It should be noted that the shock absorber 15 may be disposed between the vehicle body 10a and the wheel supporting member 12 in a case where the suspension spring 16 is elastically disposed in a manner as described.

The shock absorber 15 in this embodiment is an invariable damping force shock absorber, however, the shock absorber 15 may be a variable damping force shock absorber. The shock absorber 15 may be disposed between the vehicle body 10a and the wheel supporting member 12. The shock absorber 15 and the suspension spring 16 may be disposed between the vehicle body 10a and the wheel supporting member 12. Furthermore, the suspension spring 16 may be elastically disposed between the vehicle body 10a and the suspension arm 14 without utilizing the shock absorber 15. Namely, the upper end of the suspension spring 16 may be connected to the vehicle body 10a and the lower end of the suspension spring 16 may be connected to the suspension arm 14. When the suspension spring 16 is elastically disposed in this manner, the shock absorber 15 and the suspension spring 16 may be disposed between the vehicle body 10a and the wheel supporting member 12.

A front left wheel active actuator 17FL, a front right wheel active actuator 17FR, a rear left wheel active actuator 17RL, and a rear right wheel active actuator 17RR are provided between the vehicle body 10a and the respective suspension arms 14. The front left wheel active actuator 17FL, the front right wheel active actuator 17FR, the rear left wheel active actuator 17RL, and the rear right wheel active actuator 17RR are referred to as "a front left wheel actuator 17FL, a front right wheel actuator 17FR, a rear left wheel actuator 17RL, and a rear right wheel actuator 17RR", respectively.

The front left wheel actuator 17FL, the front right wheel actuator 17FR, the rear left wheel actuator 17RL, and the rear right wheel actuator 17RR" are sometimes referred to as the "wheel actuators 17FR-17RR". When the front left wheel actuator 17FL, the front right wheel actuator 17FR, the rear left wheel actuator 17RL, and the rear right wheel actuator 17RR" need not be distinguished from each other, each of them is referred to as the "wheel actuator 17". When the front left wheel actuator 17FL and the front right wheel actuator 17FR need not be distinguished from each other, each of them is referred to as the "front wheel actuator 17F". When the rear left wheel actuator 17RL and the rear right wheel actuator 17RR need not be distinguished from each other, each of them is referred to as the "rear wheel actuator 17R".

The wheel actuator 17 is disposed/arranged in parallel with the shock absorber 15 and the suspension spring 16. The wheel actuator 17 functions as an actuator that variably generate, hydraulically or electro-magnetically, a force acting between the vehicle body 10a and the wheel 11. The wheel actuator 17 forms an active suspension together with the shock absorber 15, the suspension spring 16, and the like. The wheel actuator 17 may be a known actuator in the relevant technical field, as long as the wheel actuator 17 is controlled by an electronic control unit (hereinafter, referred to as an "ECU") 30 so that the wheel actuator 17 can generate the force (hereinafter, referred to as an "actuator force" or a "control force") acting between the vehicle body 10a and the wheel 11. The wheel actuator 17 is sometimes referred to as a "control force generating device", for the sake of convenience. The actuator force is sometimes referred to as a "control force", for the sake of convenience.

Referring back to FIG. 1, the vehicle 10 comprises the data collecting apparatus 20. The data collecting apparatus 20 includes an electronic control apparatus (hereinafter, referred to as the "ECU 30"), vertical direction acceleration sensors 31FR-31RR, stroke sensors 32FR-32RR, a vehicle state sensor 33, a position obtaining apparatus 34, a preview sensor 35, and a radio communication device 36.

The ECU 30 is an electronic control unit that includes a microcomputer as a main component, and is sometimes referred to as a controller. The microcomputer includes a CPU, a ROM, a RAM, and an interface (I/F). The CPU is configured or programmed to realize various functions by executing instructions (or programs, or routines) stored in the ROM.

The ECU 30 is connected with the vertical direction acceleration sensors 31FR-31RR, the stroke sensors 32FR-32RR, the vehicle state sensor 33, the position obtaining apparatus 34, and the preview sensor 35.

Each of the vertical direction acceleration sensors 31FL-31RR is configured to sequentially and successively detect a vertical direction acceleration of a vehicle body 10a (sprung mass/sprung mas members) of the vehicle 10 so as to generate a signal indicative of the vertical direction acceleration of the sprung mass. It should be noted that the sprung mass includes parts in the side of the vehicle body 10a with respect to the suspension spring 16 among parts such as the vehicle body 10a, and the shock absorber 15.

The stroke sensors 32FL-32RR are provided for the front left suspension 13FL, the front right suspension 13FR, the rear left suspension 13RL, and the rear right suspension 13RR, respectively.

The stroke sensors 32FL-32RR detect sequentially and successively vertical direction strokes of the front left suspension 13FL to the rear right suspension 13RR, respectively, so as to generates signals indicative of the detected respective vertical direction strokes. Furthermore, each of the stroke sensors 32FL-32RR multiplies the signal indicative of the detected vertical direction stroke by a correction coefficient (e.g., a correction coefficient determined based on an arm ratio of the suspension) to obtain a relative displacement in the vertical direction between the sprung mass and the unsprung mass of the vehicle 10 (hereinafter, the relative displacement may sometimes be referred to as a "relative vertical displacement between the sprung mass and an unsprung mass". Each of the stroke sensors 32FL-32RR generates a signal indicative of the thus obtained relative vertical displacement between the sprung mass and the unsprung mass. It should be noted that the unsprung mass includes parts in the side of the wheels with respect to the suspension spring 16 among parts such as the wheel 11 and the shock absorber 15 of the vehicle 10.

The vehicle state sensor 33 includes various sensors, each detecting a state of the vehicle 10 (i.e., a speed of the vehicle 10, an acceleration of the vehicle 10, a direction of the acceleration of the vehicle 10). The vehicle state sensor 33 includes following sensors.

A vehicle speed sensor for detecting a running/traveling speed (i.e., vehicle speed) of the vehicle 10.

Wheel speed sensors, each of which is for detecting a wheel speed.

A front-rear direction acceleration sensor for detecting an acceleration in a front-rear direction of the vehicle 10.

A lateral direction acceleration sensor for detecting an acceleration in a lateral direction of the vehicle 10.

A yaw rate sensor for detecting a yaw rate of the vehicle 10.

The position obtaining apparatus 34 includes a GNSS (Global Navigation Satellite System) receiver for detecting a present position of the vehicle 10, a map data base, and a display. The GNSS receiver sequentially and successively receives signals transmitted from satellites (positioning satellites). The map data base has stored information including a road map information. The position obtaining apparatus 34 obtains/specifies sequentially and successively a present position (e.g., position represented by latitude and longitude) of the vehicle 10 based on the signals received by the GNSS receiver and generates a signal indicative of the specified resent position. It should be noted that the position obtaining apparatus 34 may detect a group of feature points of a road, buildings, or the like using a LiDAR and/or a camera sensor that the vehicle 10 includes, and may obtain/specify the present position of the vehicle 10 based on the detected group of feature points and a three dimensional map including a relationship between a position and the group of feature points (refer to, for example, Japanese Patent Application Laid-Open (kokai) No. 2020-16541).

The preview sensor 35 is configured to sequentially and successively detect a relative vertical displacement of a road surface with respect to the vehicle body 10a of the vehicle 10 so as to generate a signal indicative of the relative vertical displacement of the road surface with respect to the vehicle body 10a. For example, the preview sensor 35 is one of the camera sensor, the LiDAR, and a radar sensor.

The signals of sensor values (detected values) generated by the sensors described above and the position obtaining apparatus 34 are sequentially and successively transmitted to the radio communication device 36 via the ECU 30 to which the sensors and the position obtaining apparatus 34 are connected. It should be noted that the signals of the sensor values may be directly transmitted to the radio communication device 36 without going through the ECU 30.

The radio communication device 36 is configured to sequentially and successively convert a group or a set (data) of the sensor values sent from the sensors described above and the position obtaining apparatus 34 into "data that can be transmitted to the server on the internet", and sequentially and successively send the converted data to the server that is the cloud 40 in the present example. The group or the set (data) of the sensor values described above is time series data and is referred to as "sensing data". The sensing data includes time series data of the vertical direction acceleration of the unsprung mass, time series data of the relative vertical displacement between the sprung mass and the unsprung mass, and time series data of the positions of the vehicle 10. The time series data of the vertical direction acceleration of the unsprung mass includes the sensor values of the vertical direction acceleration of the unsprung mass and information of time points at which the respective sensor values thereof are detected/obtained. Similarly, the time series data of the relative vertical displacement between the sprung mass and the unsprung mass includes the sensor values of the relative vertical displacement between the sprung mass and the unsprung mass and information of time points at which the respective sensor values thereof are detected/obtained. The time series data of the positions includes the positions obtained by the position obtaining apparatus 34 and information of time points at which the respective positions are obtained.

The cloud 40 successively receives a predetermined amount of the sensing data transmitted by the radio communication device 36. The cloud 40 means a cloud computing. As shown in FIG. 1, the cloud 40 includes, as function blocks, a front end section/device 41, a data processing section/device 42, a processing-data-base-section (a temporally storing device for data to be processed) 43, and a storing/accumulating data base section (a permanently storing device) 44 for storing/accumulating road surface displacement correlating values (information) described later. The function blocks are implemented by an arbitrary combination of hardware and software. The hardware may include physical devices (e.g., computers, physical devices connected to computers, or the like), physical elements (e.g., CPUs, memories (e.g., RAM, ROM, Hard-Disk), input devices, and output devices.

The front end section 41 is configured to receive data from and transmit data to the radio communication device 36 through a communication link (e.g., an internet connection). The front end section 41 is configured to receive the sensing data transmitted from the radio communication device 36, and output/send the received sensing data to the data processing section 42.

The data processing section 42 is configured to temporarily store (accumulate, hold) the sensing data in/into the processing-data-base-section 43. The data processing section 42 is configured to fetch (obtain) a certain amount of (or a chunk of) the temporarily stored sensing data from the processing-data-base-section 43, and process the fetched sensing data so as to obtain through calculation (calculate) the road surface displacement correlating value(s) from the fetched sensing data. It should be noted that the method for obtaining through calculation the road surface displacement correlating value will be described later.

The road surface displacement correlating value represents information correlating with vertical displacement of the road representative of concavity and convexity of the road surface. More specifically, the road surface displacement correlating value may be at least one of the following values.

unsprung mass displacement z1 that is a vertical displacement of the unsprung mass.
unsprung mass displacement rate dz1 that is a time derivative value of the unsprung mass displacement z1.
road surface vertical displacement z0 that is a vertical displacement of the road surface.
road surface vertical displacement rate dz0 that is a time derivative value of the road surface vertical displacement z0.

In the present example, the road surface displacement correlating value is the unsprung mass displacement z1, however, the road surface displacement correlating value may be one of the above values other than the unsprung mass displacement z1, or a combination of the unsprung mass displacement z1 and the other one of the above values other than the unsprung mass displacement z1.

The data processing section 42 is configured to store the calculated road surface displacement correlating value (i.e., the unsprung mass displacement z1) in (into) the storing-data-base-section 44 while correlating the calculated road surface displacement correlating value with position information (namely, in such a manner that the road surface displacement correlating value and position information are associated with each other). The position information is information that can two-dimensionally specify, using a road longitudinal direction location and a road width direction location, a position on a road to which the calculated road surface displacement correlating value corresponds. The position information is typically represented by the latitude and the longitude of that position corresponding to the calculated road surface displacement correlating value. It should be noted that storing the calculated road surface displacement correlating value is meant to include updating the storing-data-base-section 44 based on the calculated road surface displacement correlating value.

<Data Processing>

Figure 3:
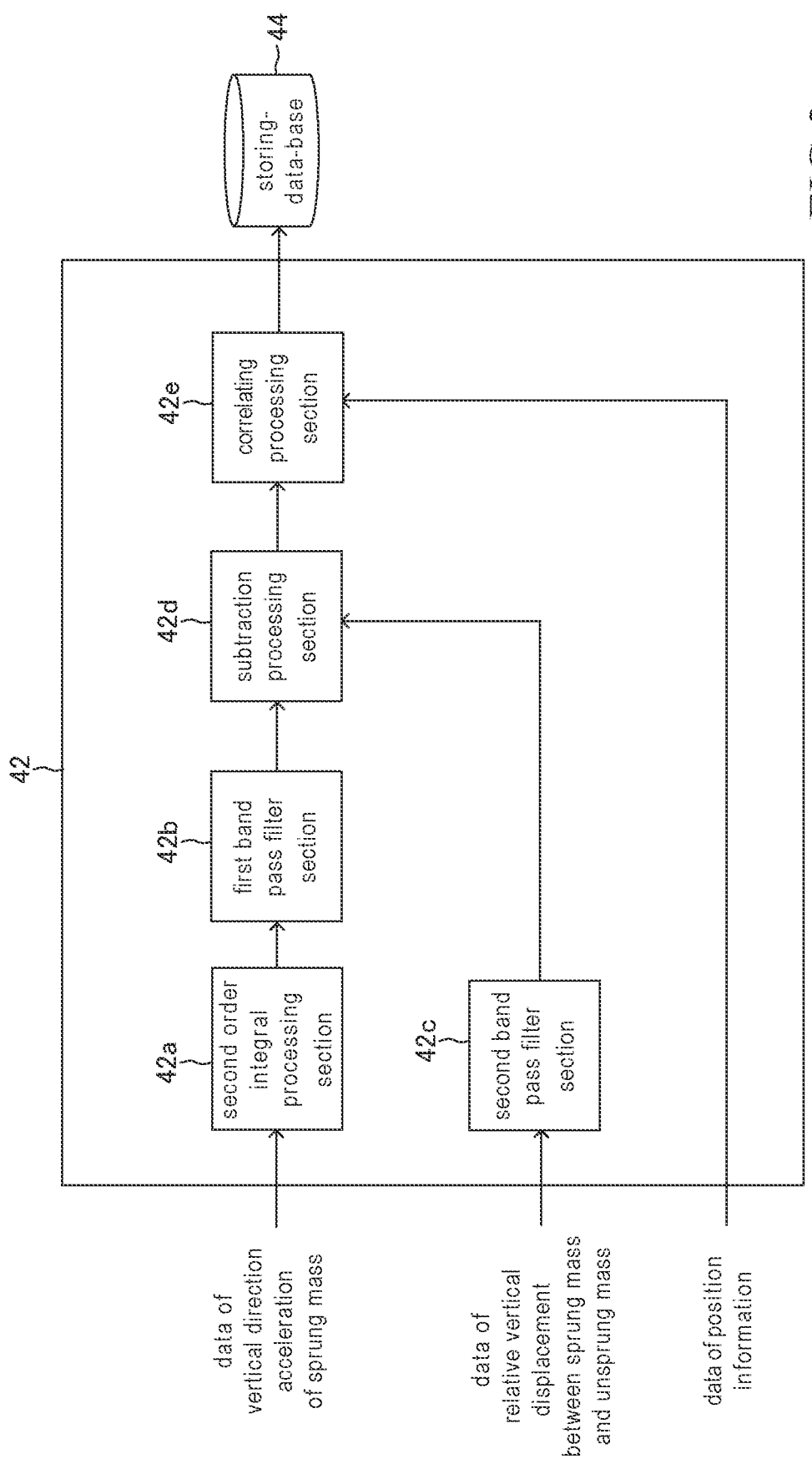
FIG. 3 is a function block diagram of the data processing section shown in FIG. 1.

The data processing performed by the data processing section 42 of the cloud 40 in order to acquire the unsprung mass displacement z1 will next be described. As shown in FIG. 3, the data processing section 42 includes, as function blocks, a second order integral processing section 42a, a first band pass filter section 42b, a second band pass filter section 42c, a subtraction processing section 42d, and a correlating processing section 42e. The function blocks are implemented by an arbitrary combination of hardware and software.

The data processing section 42 processes data in an offline processing where a certain amount (a chunk) of sensing data comprising the sensor values are processed collectively after the sensor values have been obtained. In other words, the data processing section 42 does not process data every time the sensor value is obtained/transmitted from the radio communication device 36.

For the offline processing, the data processing section 42 obtains a certain amount of the following data, as the sensing data, every time a predetermined time elapses, from the processing-data-base-section 43.

time series data of the vertical direction acceleration of the sprung mass whose detected time stored in the processing-data-base-section 43 falls within a certain period.
time series data of the relative vertical displacement between the sprung mass and the unsprung mass whose detected time stored in the processing-data-base-section 43 falls within the same certain period.
time series data of the position whose detected time stored in the processing-data-base-section 43 falls within the same certain period.

The data processing section 42 performs the data processing for the thus obtained sensing data as follows. It should be noted that the data processing (i.e., integral processing in the offline processing and filtering processing in the offline processing) described below requires a certain time, and thus, cannot be performed in a real time processing that must be performed in a short time. In view of this, the present example employs the offline processing (i.e., integral processing in the offline processing and filtering processing in the offline processing). The data processing in the offline processing may be referred to as an "offline data processing", for the sake of convenience.

The time series data of the vertical direction acceleration of the unsprung mass is input/transmitted to the second order integral processing section 42a of the data processing section 42. The second order integral processing section 42a performs second-order-integration processing of/for the time series data of the vertical direction acceleration of the sprung mass with respect to time. This generates/provides the sprung mass displacement z2 from the vertical direction acceleration of the sprung mass. In other words, the time series data of the sprung mass displacement z2 is therefore generated.

The second-order-integration processing is performed as follows. The second order integral processing section 42a converts the time series data z(t) of the vertical direction acceleration of the sprung mass into the frequency spectrum x(f) through the FFT (Fast Fourier Transform). z(t) is a function of time t for representing the of the vertical direction acceleration of the sprung mass. x(f) is a function of frequency f for representing an amplitude (intensity, strength) of the vertical direction acceleration of the sprung mass for each of frequencies.

The second order integral processing section 42a second order integrates (integrates twice) "$x(f)/(i \cdot 2\pi \cdot f)^2$". Thereafter, the second order integral processing section 42a performs the Fourier inverse transform (inverse FFT) on the function obtained by the second order integration of x(f). As a result, the time series data of the sprung mass displacement z2 is generated/obtained from the time series data of the vertical direction acceleration of the sprung mass.

The thus generated time series data of the sprung mass displacement z2 is input/transmitted to the first band pass filter section 42b. The first band pass filter section 42b performs band pas filtering processing (hereinafter, referred to as a "BPF processing") of/for the time series data of the sprung mass displacement z2 to make "components of the time series data of the sprung mass displacement z2 that are/fall within a particular/specific frequency band" pass through. By the BPF processing, the time series data of the sprung mass displacement z2 from which components other than ones falling within the particular frequency band are eliminated is generated, and is input/transmitted to the subtraction processing section 42d.

In some embodiments, the particular frequency band is set at a band that includes/covers at least a sprung mass resonance frequency (i.e., the sprung mass resonance frequency falls within the particular frequency band). In the present example, the particular frequency band is equal to or higher/greater than a first cut off frequency, and is equal to or lower/smaller than a second cut off frequency. The first cut off frequency is lower/smaller than the sprung mass resonance frequency. The second cut off frequency is higher/greater than the sprung mass resonance frequency.

Since the particular frequency band is set as above, data of unsprung mass displacements z1, that are accurate with respect to actual unsprung mass displacements caused by actual road surface displacements and that can improve damping effect of a preview damping control (described later in detail) using the data of unsprung mass displacements z1, can be generated/provided as described later.

More specifically, since the particular frequency band includes the sprung mass resonance frequency, and thus, the data of the unsprung mass displacements z1 will be obtained in such a manner that the unsprung mass displacements z1 reflects the components having the sprung mass resonance frequency. Since this unsprung mass displacements z1 is used for the preview damping control, the ability to damp the vibration of the sprung mass around the sprung mass resonance frequency can be enhanced.

Furthermore, the time series data of the vertical direction acceleration of the sprung mass includes components having frequencies lower than the first cut off frequency, and thus, "the time series data of the sprung mass displacement z2" generated by the second order integral processing section 42a is affected by that components. However, in the present example, the time series data of the sprung mass displacement z2" generated by the first band pass filter section 42b is not affected by the components having frequencies lower than the first cut off frequency. Therefore, as described later, it is possible to obtain the more suitable unsprung mass displacements z1 for the preview damping control.

In addition, a frequency band higher than the second cut off frequency is not included in the particular frequency band. If the time series data of the sprung mass displacement z2 that includes components having frequencies higher than the second cut off frequency is used to obtain the time series data of the unsprung mass displacements z1, the time series data of the unsprung mass displacements z1 includes components having frequencies higher than the second cut off frequency. When the time series data of the unsprung mass displacements z1 including the components having frequencies higher than the second cut off frequency is used for the preview damping control, the ability to damp the vibration of the sprung mass may be degraded due to the individual variability of the vehicle 10 and difference in the traveling state of the vehicle 10. However, in the present example, the time series data of the sprung mass displacement z2" generated by the first band pass filter section 42b is not affected by the components having frequencies higher than the second cut off frequency. Therefore, as described later, it is possible to obtain the more suitable unsprung mass displacements z1 for the preview damping control.

For example, the above BPF processing is implemented by a Zero-phase filtering process. More specifically, the first band pass filter section 42b executes a BPF processing in the time forward direction for the input time series data of the sprung mass displacement z2 and executes a BPF processing in the time backward direction for the input time series data of the sprung mass displacement z2, and averages the both of the BPF processing results, in order to execute the above BPF processing. The BPF processing in the time forward direction means filtering (BPF) process for the time series data in a direction from a first value of the time series data to a last value of the time series data. The BPF processing in the time backward direction means filtering (BPF) process for the time series data in a direction from the last value of the time series data to the first value of the time series data. Such a Zero-phase filtering process is known for causing no phase delay in the filtering process.

It should be noted that the above BPF processing may be implemented by an FFT process that is executed as follows. That is, the first band pass filter section 42b converts the time series data of the sprung mass displacement z2 into the frequency spectrum X(f) through the FFT. Then, the first band pass filter section 42b performs a process to decrease "components of the converted frequency spectrum" corresponding to frequencies outside (other than frequencies within) the particular frequency band, and then, performs the Fourier inverse transform (inverse FFT) on the thus obtained converted frequency spectrum so as to generate the time series data of the sprung mass displacement z2 from which the components other than ones within the particular frequency band are eliminated or decreased. The BPF processing using the FFT described above also causes no phase delay in the filtering process.

The time series data of the relative vertical displacement between the sprung mass and the unsprung mass is input/transmitted to the second band pass filter section 42c. The filtering property of the second band pass filter section 42c is the same as the filtering property of the first band pass filter section 42b. Namely, the second band pass filter section 42c performs the BPF processing of the time series data of the relative vertical displacement between the sprung mass and the unsprung mass to make components of the time series data of the relative vertical displacement between the sprung mass and the unsprung mass that are within the particular frequency band pass through. By the BPF processing, the time series data of the relative vertical displacement between the sprung mass and the unsprung mass from which components other than ones within the particular frequency band are eliminated is generated, and is input/transmitted to the subtraction processing section 42d.

This BPF processing by the second band pass filter section 42c is implemented by a Zero-phase filtering process, similarly to the first band pass filter section 42b. It should be noted that the processing by the second band pass filter section 42c may be implemented by an FFT process, similarly to the first band pass filter section 42b.

It should also be noted that each of the first band pass filter section 42b and the second band pass filter section 42c may be replaced with either a high pass filter section having a cut off frequency that is set at the first cut off frequency or a low pass filter section having a cut off frequency that is set at the second cut off frequency. In any one of those cases, the data of the unsprung mass displacements $z1$ that can be used for the preview damping control and improve the damping ability of the vibration of the sprung mass around the sprung mass resonance frequency is generated.

The subtraction processing section 42d subtracts the relative vertical displacement between the sprung mass and the unsprung mass after the BPF processing ($=z2-z1$) from the sprung mass displacement ($z2$) after the BPF processing to obtain/generate time series data of the unsprung mass displacement $z1$, as follows (i.e., $z1=z2-(z2-z1)$). The thus obtained time series data of the unsprung mass displacement $z1$ is input/transmitted to the correlating processing section 42e. The relative vertical displacement between the sprung mass and the unsprung mass after the BPF processing ($=z2-z1$) may be referred to as the post processed relative vertical displacement data. The sprung mass displacement ($z2$) after the BPF processing may be referred to as the post processed sprung mass displacement data.

The time series data of the position (position information) is also input/transmitted to the correlating processing section 42e. The correlating processing section 42e correlates the unsprung mass displacement $z1$ with the position (position information), both having the common (same) detected time, and store them into the storing-data-base-section 44 (with maintaining the correlation between the unsprung mass displacement $z1$ with the position). Consequently, the unsprung mass displacement $z1$ and the position are stored in the storing-data-base-section 44 in such a manner that they are correlated/associated with each other.

As has been described above, the data processing section 42 generates the data of the unsprung mass displacement $z1$ by performing the specific data processing for the sensing data, wherein the specific data processing can only be executed/implemented in the offline processing manner (and not in the real time manner). Furthermore, the data processing section 42 stores the generated unsprung mass displacement $z1$ in the storing-data-base-section 44. Thus, the data of the unsprung mass displacement $z1$ can be stored in the storing-data-base-section 44, wherein the data of the unsprung mass displacement $z1$ has the following features.

The data has a small error in the integration.
The data has no phase delay caused by the filtering process.
The data is accurate since the components other than the ones within the particular frequency band are eliminated.

Therefore, when the data is used for the preview damping control, the damping effect can be enhanced.

The vehicle 10 will next be described (refer to FIG. 4), the vehicle 10 comprising a damping control apparatus 120 configured to perform the damping control (preview damping control) using the unsprung mass displacement $z1$, stored in the cloud 40 (e.g., the storing-data-base-section 44), as the road surface displacement correlating value. It should be noted that the vehicle 10 may comprise the above-described data collecting apparatus 20 in addition to the damping control apparatus 120. Alternatively, the damping control apparatus 120 may include not only functions of the damping control apparatus 120 but also the functions of the above-described data collecting apparatus 20. In addition, in the present example, the unsprung mass displacement $z1$ functions as the road surface displacement correlating value, however, the road surface displacement correlating value may be values other than the unsprung mass displacement $z1$.

Figure 4:
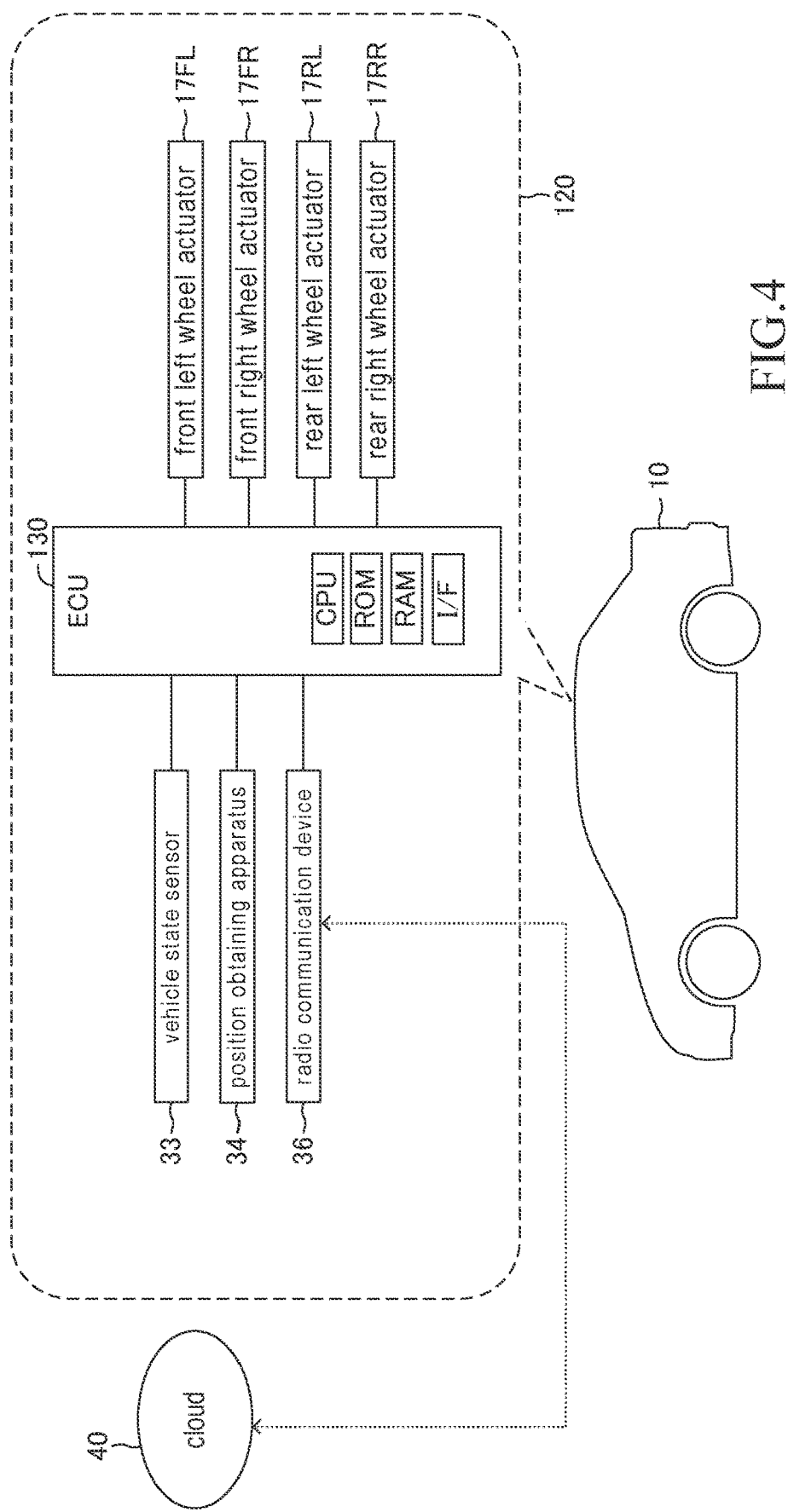
FIG. 4 is a schematic diagram of a preview damping control apparatus.

As shown in FIG. 4, the damping control apparatus 120 is installed in (or mounted on) the vehicle 10. The damping control apparatus 120 comprises an electronic control unit 130 (hereinafter, referred to as an "ECU 130"), an unillustrated memory device 130a, the vehicle state sensor 33, the position obtaining apparatus 34, and the radio communication device 36. In addition, the damping control apparatus 120 comprises the front left wheel actuator 17FL, the front right wheel actuator 17FR, the rear left wheel actuator 17RL, and the rear right wheel actuator 17RR, described above.

The ECU 130 is an electronic control unit that includes a microcomputer as a main component, and is sometimes referred to as a controller. The microcomputer includes a CPU, a ROM, a RAM, and an interface (I/F). The CPU is configured or programmed to realize various functions by executing instructions (or programs, or routines) stored in the ROM.

The ECU 130 is connected with the vehicle state sensor 33 so as to receive signals generated by various sensors included in the vehicle state sensor 33.

The ECU 130 is connected with the position obtaining apparatus 34 and the radio communication device 36.

The radio communication device 36 is a terminal for connecting the ECU 130 to the cloud 40, and is configured to transmit information to and receive information from the cloud 40 through the internet connection.

The ECU 130 is configured to obtain, through the communication established by the radio communication device 36, the road surface displacement correlating value, that is the unsprung mass displacement $z1$ in the present example, at an arbitrary position on the road (specified two-dimensionally by a road longitudinal direction location and a road width direction location) from the data base (i.e., the storing-data-base-section 44) of the cloud 40.

Furthermore, the ECU 130 are connected to the front left wheel actuator 17FL, the front right wheel actuator 17FR, the rear left wheel actuator 17RL, and the rear right where actuator 17RR, through unillustrated drive circuits.

The ECU 130 obtains through calculation a target actuator force Fct for damping (decreasing) a vibration of the sprung mass (sprung member) of the wheel 11. The ECU 130 instructs the wheel actuator 17 to generate/output an actuator force Fc corresponding (equal) to the target actuator force Fct. The thus instructed wheel actuator 17 generates/outputs the actuator force Fc corresponding (equal) to the target actuator force Fct.

<Outline of Preview Damping Control>

Figure 5:
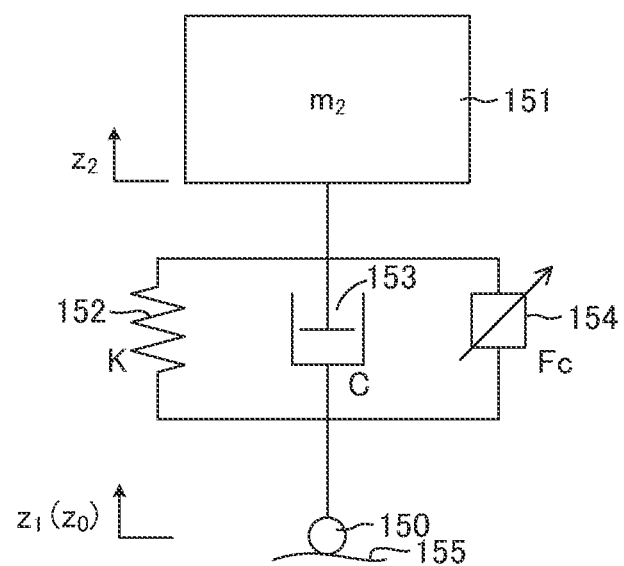
FIG. 5 is a figure illustrating a single/one wheel model of a vehicle.

An outline of the preview damping control performed by the damping control apparatus 120 will next be described. FIG. 5 illustrates a single wheel model of the vehicle 10. An unsprung mass (unsprung mass member) 150 includes parts in the side of the wheel 11 with respect to the suspension spring 16 among parts such as the wheel 11, the shock absorber 15, or the like. A sprung mass (sprung member) 151 includes parts in the side of the vehicle body 10a with respect to the suspension spring 16 among parts such as the vehicle body 10a, the shock absorber 15, or the like.

A spring 152 corresponds to the suspension spring 16. A damper 153 corresponds to the shock absorber 15. An actuator 154 corresponds to the wheel actuator 17.

A mass of the sprung mass 151 is represented as a sprung mass $m2$. Vertical displacements of "the road surface 155, the unsprung mass 150, and the sprung mass 151" are represented as a road surface vertical displacement $z0$, an unsprung mass displacement $z1$, and a sprung mass displacement $z2$, respectively. A spring constant (equivalent spring constant) of the spring 152 is represented as a constant $K$. A damping coefficient (equivalent damping coefficient) of the damper 153 is represented as a damping coefficient $C$. A force generated by the actuator 154 is represented as an actuator force Fc. It should be noted that it is assumed that the damping coefficient $C$ is constant, however, the damping coefficient $C$ may be a value varying depending on a time derivative value of a stroke of the suspension, since an actual damping coefficient varies depending on a stroke rate of the suspension.

Time derivative values of $z1$ and $z2$ are represented as $dz1$ and $dz2$, respectively. Second order time derivative values of $z1$ and $z2$ are represented as $ddz1$ and $ddz2$, respectively. The values of $z0$, $z1$, and $z2$ become positive when the respective parts move upward. The forces generated by the spring 152, the damper 153, and the actuator 154 have positive signs when direction of the forces generated by them is upward.

In the single wheel model shown in FIG. 5, a motion equation regarding a vertical direction movement of the sprung mass 151 is expressed as an equation (1) below.

$$m2 \cdot ddz2 = C \cdot (dz1-dz2) + K \cdot (z1-z2) - Fc \quad (1)$$

When the vibration of the sprung mass 151 is completely cancelled (eliminated) by the actuator force Fc (in other words, when the acceleration $ddz2$, the rate $dz2$, and the displacement $z2$, of the sprung mass 151 are made to be zero), the actuator force Fc is expressed as an equation (2) below.

$$Fc = C \cdot dz1 + K \cdot z1 \quad (2)$$

Thus, the actuator force Fc that can cancel the vibration of the sprung mass 151 can be expressed as an equation (3) below. In the equation (3), a is an arbitrary constant that is larger than 0, and equal to or smaller than 1.

$$Fc = \alpha \cdot (C \cdot dz1 + K \cdot z1) \quad (3)$$

By applying the equation (3) to the equation (1), the equation (1) can be expressed as an equation (4) below.

$$m2 \cdot ddz2 = C \cdot (dz1-dz2) + K \cdot (z1-z2) - \alpha \cdot (C \cdot dz1 + K \cdot z1) \quad (4)$$

When a Laplace transform is performed for the equation (4), and then the result is deformed, the equation (4) can be expressed as an equation (5) below. In other words, the equation (5) represents a transfer function from the unsprung mass displacement $z1$ to the sprung mass displacement $z2$. In the equation (5), "s" represents a Laplace operator.

$$\frac{z2}{z1} = \frac{(1-\alpha)(Cs+K)}{m_2 s^2 + Cs + K} \quad (5)$$

As understood from the equation (5), a magnitude of the transfer function varies depending on a, and becomes minimum when a is equal to 1. Therefore, the target actuator force Fct may be expressed as an equation (6) below, wherein $\alpha \cdot C$ and $\alpha \cdot K$ in the equation (3) are replaced with gains 131 and 132, respectively.

$$Fct = \beta 1 \cdot dz1 + \beta 2 \cdot z1 \quad (6)$$

In view of the above, the ECU 130 obtains in advance the unsprung mass displacement $z1$ at a position at which the wheel 11 will reach (pass through), and obtains through calculation the target actuator force Fct for the actuator 154 using the obtained unsprung mass displacement $z1$ and the equation (6) with the gains 131 and 132 that have been adjusted appropriately. The position at which the wheel 11 will reach can be two-dimensionally specified, using the road longitudinal direction location and the road width direction location. The ECU 130 lets the actuator 154 generate the actuator force Fc corresponding (equal) to the calculated/obtained target actuator force Fct at a time point at which an actual unsprung mass displacement becomes equal to the unsprung mass displacement $z1$ applied to the equation (6). In this manner, the amplitude of the vibration of the sprung mass 151 of when the actual unsprung mass displacement becomes equal to the unsprung mass displacement $z1$ applied to the equation (6) can be decreased.

It should be noted that the target actuator force Fct for the actuator 154 can be calculated using an equation (7) below in place of the equation (6). The equation (7) is different from the equation (6) only in that the derivative term ($\beta 1 \cdot dz1$) in the equation (6) is omitted. In this case as well, since the actuator force Fc ($=\beta 2 \cdot z1$) to cancel the vibration of the sprung mass 151 is generated from the actuator 154, the amplitude of the vibration of the sprung mass 151 can be decreased as compared to a case where the actuator force Fc is not generated.

$$Fct = \beta 2 \cdot z1 \quad (7)$$

In this manner, the ECU 130 obtains, using the equation (6) or the equation (7), the target actuator force Fct based on the unsprung mass displacement $z1$ at a predicted passing through position of the wheel 11. The ECU 130 controls the wheel actuator 17 (i.e., sends an instruction to the wheel actuator 17 before the wheel 11 reaches the predicted passing through position) in such a manner that the wheel actuator 17 actually generates the actuator force Fc corresponding (equal) to the calculated/obtained target actuator force Fct at the time point at which the wheel 11 passes through (actually reaches) the predicted passing through position. This is the damping control of the sprung mass 151 and is referred as the preview damping control.

It should be noted that, in the above single wheel model, a mass of the unsprung mass 150 and an elastic deformation of a tire are ignored so that the road surface vertical displacement z0 is deemed to be substantially the same as the unsprung mass displacement z1. In view of this, the preview damping control may be able to be carried out using the road surface vertical displacement z0 in place of the unsprung mass displacement z1.

Figure 6:
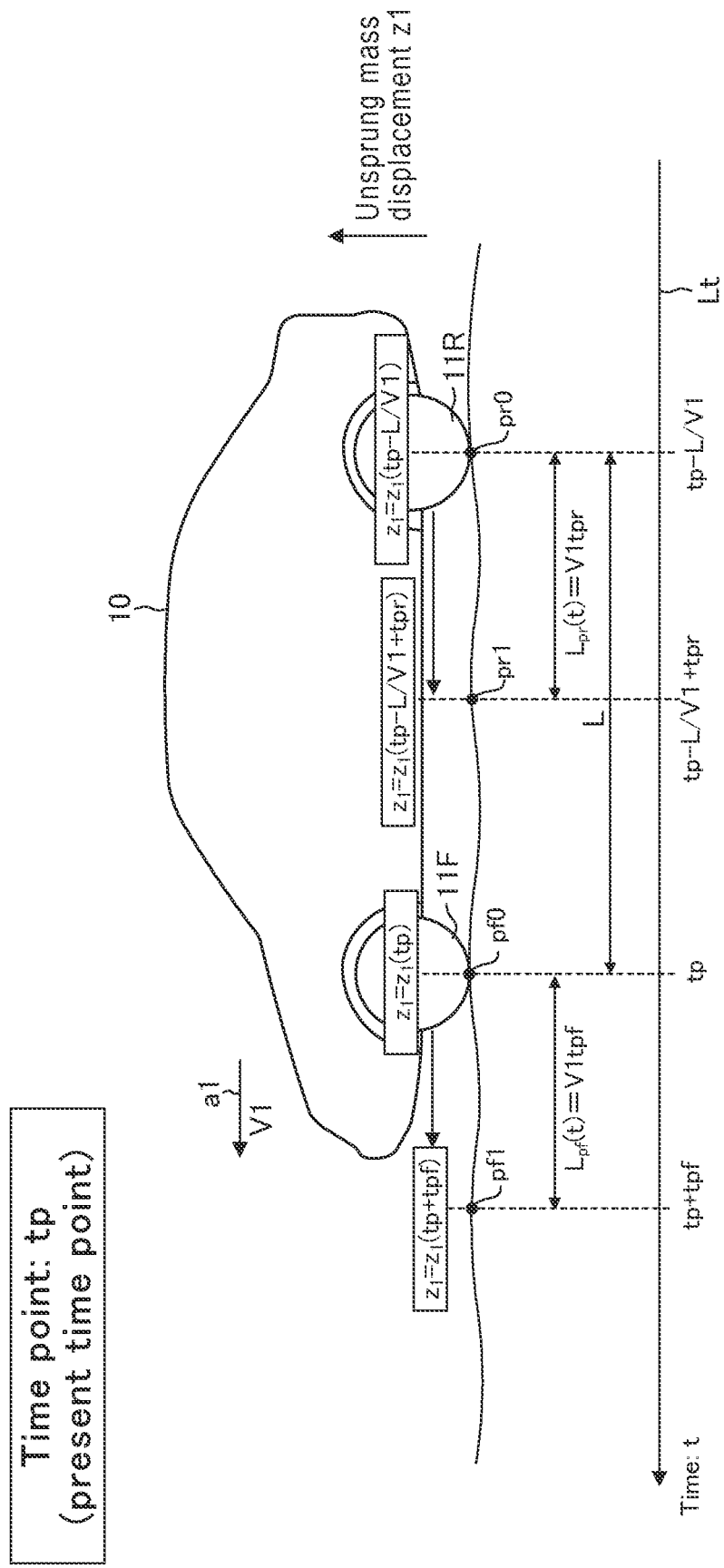
FIG. 6 is a figure for describing a preview damping control of the embodiment.
Figure 7:
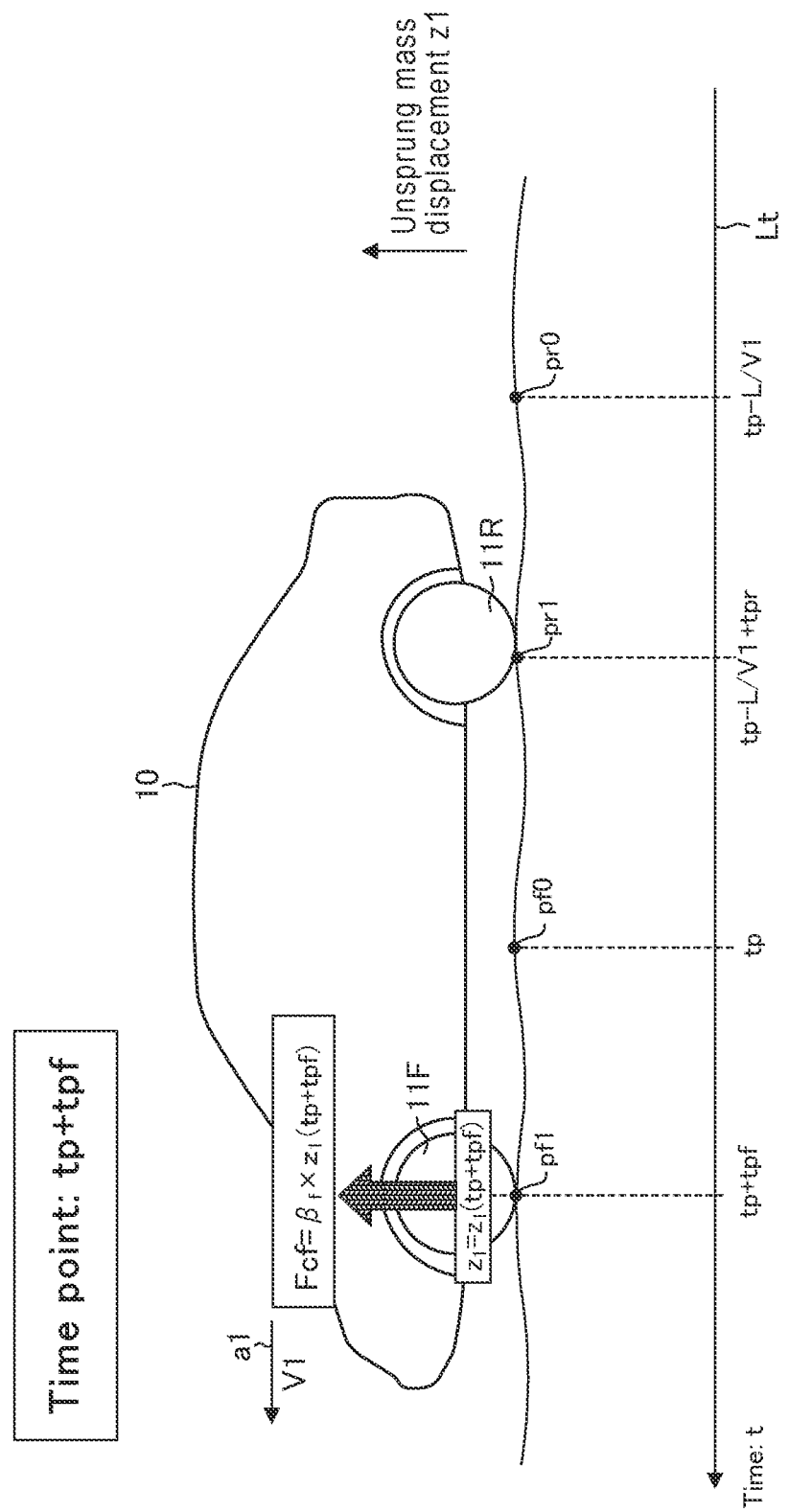
FIG. 7 is a figure for describing the preview damping control.
Figure 8:
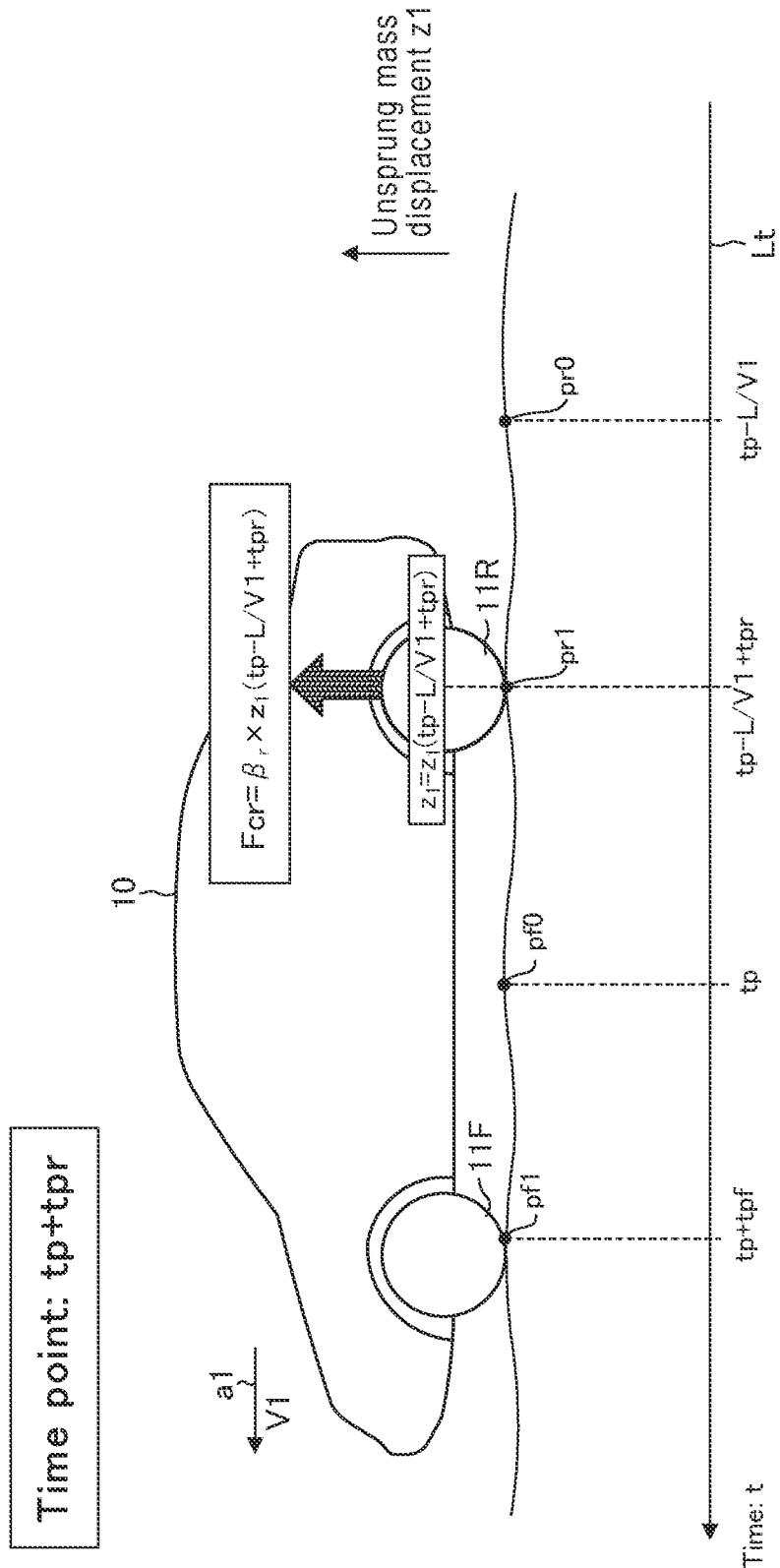
FIG. 8 is a figure for describing the preview damping control.

The preview damping control using the unsprung mass displacement z1 and the equation (7) will next be described in more detail with reference to FIGS. 6 to 8. FIG. 6 illustrates the vehicle 10 that is running/traveling at a vehicle speed V1 in a direction shown by an arrow a1 at the present time point tp. In the following descriptions, the front wheel 11F and the rear wheel 11R represent wheels on the same side of the vehicle 10 (i.e., either "the front left wheel 11FL and the rear left wheel 11RL" or "the front right wheel 11FR and the rear right wheel 11RR"). It is assumed that each of the moving speeds of the front wheel 11F and the rear wheel 11R is the same as the vehicle speed V1.

In FIG. 6, the unsprung mass displacement z1 of the front wheel 11F on a movement route of the front wheel 11F is expressed as a function z1(t), wherein t is a time. The time t can represent any of a present time point, a time point in the past, and a time point in the future. A line Lt represents time t. Accordingly, the unsprung mass displacement z1 of the front wheel 11F at a position (tire-ground contact point) pf0 at the present time point tp is expressed as z1(tp). Hereinafter, the movement route of the front wheel 11F may sometimes referred to as a "front wheel movement route".

It is further assumed that a movement route of the rear wheel 11R is the same as the front wheel movement route. Under this assumption, the unsprung mass displacement z1 of the rear wheel 11R of the vehicle 10 at a position (tire-ground contact point) pr0 at the present time point tp is expressed as z1(tp−L/V1) that is an unsprung mass displacement z1 at a time point (tp−L/V1). L is a length of a wheel base of the vehicle 10.

Namely, the unsprung mass displacement z1 of the rear wheel 11R is equal to the unsprung mass displacement z1 (tp−L/V1) at the time point (tp−L/V1) that is a "time length (L/V1) required for the front wheel 11F to move for the wheel base length L" before the present time point tp.

The ECU 130 specifies (predicts) a predicted passing through position pf1 of the front wheel 11F that is a position of the front wheel 11F at a time point (in the future) a front wheel foresee time tpf after the present time point tp. The front wheel foresee time tpf has been set at a time length of a period from a first time point to a second time point. The first time point is a time point at which the ECU 130 specifies the predicted passing through position pf1 of the front wheel 11F, determines the target actuator force Fcft based on the unsprung mass displacement z1 at the predicted passing through position pf1, and instructs the front wheel actuator 17F to generate the actuator force Fcf corresponding/equal to the target actuator force Fcft. The second time point is a time point at which the front wheel actuator 17F actually generates the actuator force Fcf that is equal to the target actuator force Fcft.

The predicted passing through position pf1 of the front wheel 11F is a position of the front wheel 11F on the front wheel movement route of when the front wheel 11F moves a distance Lpf(t) (=V1·tpf) from "the present position pf0 of the front wheel 11F at the present time point tp". Accordingly, the ECU 130 can specify/determine/predict the predicted passing through position pf1 of the front wheel 11F as follows.

The ECU 130 specifies/obtains "the position pf0 of the front wheel 11F, the vehicle speed V1, and the moving direction" of the vehicle 10, based on the information on the position of the vehicle 10 obtained from the position obtaining apparatus 34 (e.g., the present position of the vehicle 10 and a change in the position of the vehicle 10 with respect to time). The ECU 130 specifies/predicts the front wheel movement route based on "the position pf0 of the front wheel 11F, the vehicle speed V1, and the moving direction" of the vehicle 10. The ECU 130 specifies, as the predicted passing through position pf1 of the front wheel 11F, a "position on the front wheel movement route" that is the distance Lpf(t) ahead (away) from the position pf0 along the front wheel movement route, using the position pf0, the vehicle speed V1, the front wheel foresee time tpf, and the front wheel movement route.

In addition, the ECU 130 obtains through calculation the target actuator force Fcft based on the unsprung mass displacement z1 (tp+tpf) that is the unsprung mass displacement z1 at the specified predicted passing through position pf1 of the front wheel 11F.

More specifically, the ECU 130 successively obtains, from the cloud 40, data of the unsprung mass displacements z1 within a predetermined area that is ahead of the vehicle 10 and stores the data in the RAM temporarily. The thus obtained data is data that allows the ECU 130 to specify the unsprung mass displacement z1 that is associated with the position information, based on the position information. The predetermined area is an area determined in advance in such a manner that the area can cover at least the predicted passing through position pf1 of the front wheel 11F and a predicted passing through position pr1 of the rear wheel 11R described later. The ECU 130 holds/stores temporarily, in the RAM, the data representing unsprung mass displacements z1 within the predetermined area that covers the predicted passing through position pf1 and the predicted passing through position pr1 at least until predicted passing through position pf1 and the predicted passing through position pr1 are actually specified.

The ECU 130 calculates the target actuator force Fcft as follows, using the unsprung mass displacement z1(tp+tpf) at the predicted passing through position pf1 among the unsprung mass displacements z1 within the predetermined area that have been temporarily stored in the RAM. Namely, the ECU 130 obtains the unsprung mass displacement z1(tp+tpf) at the predicted passing through position pf1 from the stored data in the RAM, and the ECU 130 uses that unsprung mass displacement z1(tp+tpf) so as to obtain the target actuator force Fcft.

The ECU 130 calculates the target actuator force Fcft by applying the unsprung mass displacement z1(tp+tpf) at the predicted passing through position pf1 of the front wheel 11F to an equation (8) described below. In actuality, the ECU 130 obtains the target actuator force Fcft using an equation (9) below. The equation (8) is obtained by replacing "Fct" and "β2" in the equation (7) with "Fcft" and "βf", respectively.

$$Fcft = \beta f z1 \tag{8}$$

$$Fcft = \beta f z1(tp+tpf) \tag{9}$$

Thereafter, the ECU 130 sends an instruction to the front wheel actuator 17F so as to let the front wheel actuator 17F generate the actuator force Fcf equal to (corresponding to) the obtained target actuator force Fcft. As a result, as shown in FIG. 7, at the time point tp+tpf that is the front wheel foresee time tpf after the present time point tp, the front wheel actuator 17F generates the actuator force Fcf equal to (corresponding to) the obtained target actuator force Fcft.

Accordingly, at the time point at which the front wheel 11F actually reaches (passes through) the predicted passing through position pf1, the front wheel actuator 17F can generate the actuator force Fcf that can appropriately damp/control the vibration of the sprung mass 151 caused by the unsprung mass displacement z1 of the front wheel 11F at the predicted passing through position pf1.

Similarly, at the present time point tp, the ECU 30 specifies (predicts) a predicted passing through position pr1 of the rear wheel 11R at a time point (in the future) a rear wheel foresee time tpr after the present time point tp. The rear wheel foresee time tpr has been set at a time length of a period from a third time point to a fourth time point. The third time point is a time point at which the ECU 130 specifies the predicted passing through position pr1 of the rear wheel 11R, determines the target actuator force Fcrt based on the unsprung mass displacement z1 at the predicted passing through position pr1, and instructs the rear wheel actuator 17R to generate the actuator force Fcr corresponding/equal to the target actuator force Fcrt. The fourth time point is a time point at which the rear wheel actuator 17R actually generates the actuator force Fcr that is equal to the target actuator force Fcrt.

When a movement route of the rear wheel 11R is the same as (or is along) the front wheel movement route, the predicted passing through position pr1 of the rear wheel 11R is a position of the rear wheel 11R on the front wheel movement route of when the rear wheel 11R moves a distance Lpr(t) (=V1·tpr) from "the present position pr0 of the rear wheel 11R at the present time point tp". Accordingly, the ECU 130 can specify the predicted passing through position pr1 of the rear wheel 11R as follows.

The ECU 130 specifies, as the predicted passing through position pr1 of the rear wheel 11R, a "position on the front wheel movement route" that is the distance Lpr(t) ahead (away) from the position pr0 along the front wheel movement route, using the position pr0, the vehicle speed V1, the rear wheel foresee time tpr, and the front wheel movement route.

In addition, the ECU 130 obtains through calculation the target actuator force Fcrt based on the unsprung mass displacement z1 (tp−L/V1+tpr) that is the unsprung mass displacement z1 at the specified predicted passing through position pr1 of the rear wheel 11R.

More specifically, the ECU 130 obtains through calculation the target actuator force Fcrt as follows, using the unsprung mass displacement z1(tp−L/V1+tpr) at the predicted passing through position pr1 among the unsprung mass displacements z1 within the predetermined area that have been temporarily stored in the RAM.

The ECU 130 calculates the target actuator force Fcrt by applying the unsprung mass displacement z1(tp−L/V1+tpr) at the predicted passing through position pr1 of the rear wheel 11R to an equation (10) described below. In actuality, the ECU 130 obtains the target actuator force Fcrt using an equation (11) below. The equation (10) is obtained by replacing "Fct" and $\beta 2$" in the equation (7) with "Fcrt" and "pr", respectively.

$$Fcrt = \beta r \cdot z1 \qquad (10)$$

$$Fcrt = \beta r \cdot z1(tp - L/V1 + tpr) \qquad (11)$$

Thereafter, the ECU 130 sends an instruction to the rear wheel actuator 17R so as to let the rear wheel actuator 17R generate the actuator force Fcr equal to (corresponding to) the obtained target actuator force Fcrt. As a result, as shown in FIG. 8, at the time point tp+tpr that is the rear wheel foresee time tpr after the present time point tp, the rear wheel actuator 17R generates the actuator force Fcr equal to (corresponding to) the obtained target actuator force Fcrt.

Accordingly, at a time point at which the rear wheel 11R actually reaches (passes through) the predicted passing through position pr1, the rear wheel actuator 17R can generate the actuator force Fcr that can appropriately damp/control the vibration of the sprung mass 151 caused by the unsprung mass displacement z1 of the rear wheel 11R at the predicted passing through position pr1.

It should be noted that the ECU 130 may send an instruction to the rear wheel actuator 17R so as to let the rear wheel actuator 17R actually generate the actuator force Fcr equal to (corresponding to) a target actuator force Fcrt (=($\beta r/\beta f$)·Fcft, Fcft=$\beta f \cdot z1(tp)$) at a time point at which the rear wheel 11R reaches the position pf0 of the front wheel 11F, the target actuator force Fcrt being obtained based on the unsprung mass displacement z1 (*tp*) at the position pf0 of the front wheel 11F at the present time point. This is the outline of the basic preview damping control performed by the damping control apparatus 120.

<Specific Operation>

Figure 9:
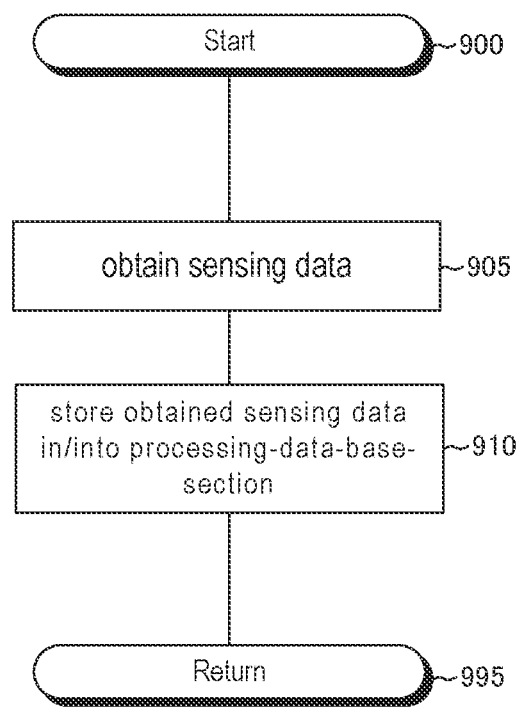
FIG. 9 is a flowchart showing a routine executed by the data processing section.
Figure 10:
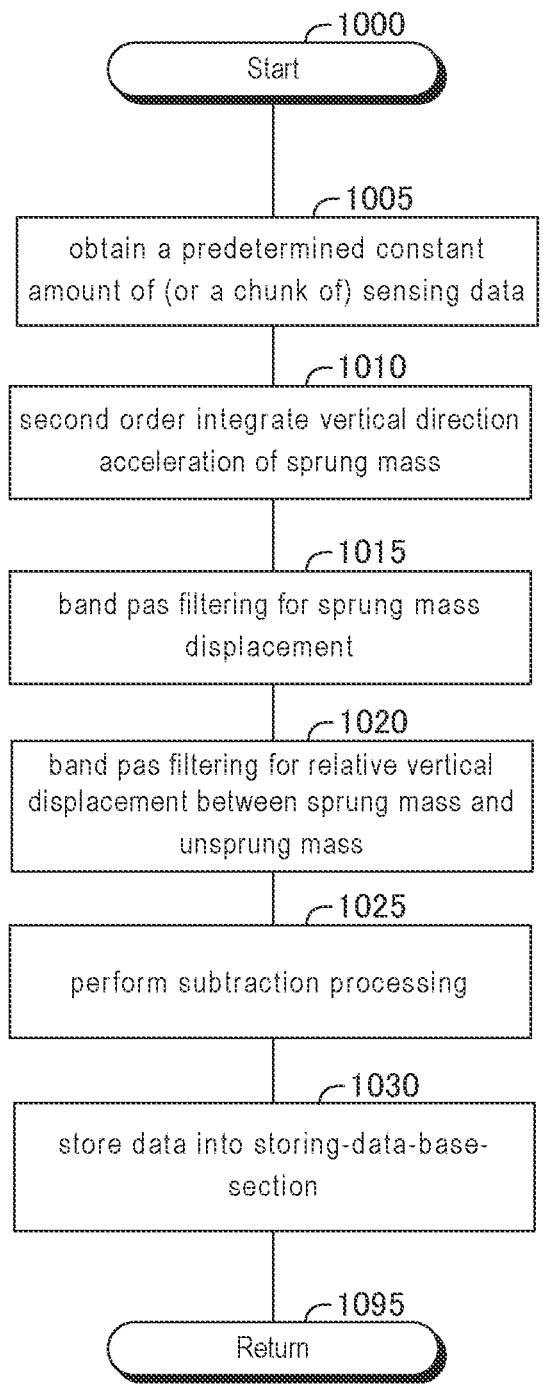
FIG. 10 is another flowchart showing a routine executed by the data processing section.

The data processing section 42 executes each of routines shown by flowcharts in FIG. 9 and FIG. 10, every time a predetermined time elapses.

Accordingly, when an appropriate time comes, the data processing section 42 starts processing from step 900 shown in FIG. 9, and sequentially executes processes of step 905 and step 910, described below. Thereafter, the data processing section 42 proceeds to step 995 so as to terminate the present routine tentatively.

Step 905: the data processing section 42 obtains/fetches the sensing data that the front end section 41 has received.

Step 910: the data processing section 42 stores the obtained sensing data in/into the processing-data-base-section 43.

When an appropriate time comes, the data processing section 42 starts processing from step 1000 shown in FIG. 10, and sequentially executes processes from step 1005 to step 1030, described below. Thereafter, the data processing section 42 proceeds to step 1095 so as to terminate the present routine tentatively.

Step 1005: the data processing section 42 obtains/fetches, from the processing-data-base-section 43, a predetermined constant amount of (or a chunk of) the sensing data (including the time series data of the vertical direction acceleration of the sprung mass, the time series data of the relative vertical displacement between the sprung mass and the unsprung mass, and the time series data of position information).

Step 1010: the data processing section 42 second order integrates (integrates twice, or performs the second order integration for) the time series data of the vertical direction acceleration of the sprung mass so as to obtain the time series data of the sprung mass displacement through the calculation, as described above.

Step 1015: the data processing section 42 performs the band pas filtering processing of/for the time series data of the sprung mass displacement of the sprung mass so as to obtain the "band-pas-filtered time series data of the sprung mass displacement (or the time series data of the sprung mass displacement after BPF processing, namely, the post processed sprung mass displacement data)", as described above.

Step 1020: the data processing section 42 performs the band pas filtering processing of the time series data of the relative vertical displacement between the sprung mass and the unsprung mass so as to obtain the "band-pas-filtered time series data of the relative vertical displacement between the sprung mass and the unsprung mass (or the time series data of the relative vertical displacement between the sprung mass and the unsprung mass after BPF processing, namely, the post processed relative vertical displacement data)", as described above.

Step 1025: the data processing section 42 performs the subtraction processing to subtract the "band-pas-filtered relative vertical displacement between the sprung mass and the unsprung mass from the "band-pas-filtered sprung mass displacement" so as to obtain/generate the (filtered) time series data of the unsprung mass displacement z1, as described above (i.e., z1=z2−(z2−z1)).

Step 1030: the data processing section 42 correlates the thus generated unsprung mass displacement z1 with the position (position information), both having the common (same) detected time, and store them into the storing-database-section 44 (with maintaining the correlation between the unsprung mass displacement z1 with the position), as described above.

The data processing apparatus (cloud 40) according to the present embodiment performs the offline processing to process data. Therefore, this allows the data processing apparatus to execute the integration processing that is ideal with little integration error and to execute the filtering processing with no phase shift. Those processes are difficult to be performed through the real time processing, since those processes require a relatively long time. Consequently, the data processing apparatus according to the present embodiment can generate the accurate data of the unsprung mass displacement z1 through the above offline processes. Thus, since the unsprung mass displacement z1 is used for the preview damping control, the damping effect of the preview damping control can be improved/enhanced.

<Modifications>

The present disclosure is not limited to the above embodiment, but may employ various modifications within the scope of the present disclosure.

For example, the data processing section 42 may be configured to generate/obtain time series data of the road surface vertical displacement z0 by performing data processing for time series data of the relative vertical direction displacement between the vehicle body 10a and the road surface, detected by the preview sensor 35, in the offline processing manner.

In the above case, every time a predetermined time elapses, the data processing section 42 may be configured to obtain, as the sensing data, from the processing-data-base-section 43, the time series data of the vertical direction acceleration of the sprung mass, the time series data of the relative vertical direction displacement between the vehicle body 10a (i.e., the sprung mass) and the road surface, and the time series data of position information. Then, the data processing section 42 performs data processing for the sensing data, as follows.

The time series data of the vertical direction acceleration of the sprung mass is input/transmitted to the second order integral processing section 42a of the data processing section 42. The second order integral processing section 42a performs the second-order-integration processing of the time series data of the vertical direction acceleration of the sprung mass with respect to time. This generates/provides the sprung mass displacement z2 from the vertical direction acceleration of the sprung mass. In other words, the time series data of the sprung mass displacement z2 is generated.

The thus generated time series data of the sprung mass displacement z2 is input/transmitted to the first band pass filter section 42b. The first band pass filter section 42b performs the BPF processing of the time series data of the sprung mass displacement z2 to make components of the time series data of the sprung mass displacement z2 that are within the particular frequency band pass through. By the BPF processing, the time series data of the sprung mass displacement z2 from which the components other than ones within the particular frequency band are eliminated is generated, and is input/transmitted to the subtraction processing section 42d.

The time series data of the relative vertical direction displacement between the vehicle body 10a (i.e., the sprung mass) and the road surface is input/transmitted to the second band pass filter section 42c. The second band pass filter section 42c performs the BPF processing of the time series data of the relative vertical displacement between the sprung mass and the road surface to make components of the time series data of the relative vertical displacement between the sprung mass and the road surface that are within the particular frequency band pass through. By the BPF processing, the time series data of the relative vertical displacement between the sprung mass and the road surface from which components other than ones within the particular frequency band are eliminated is generated, and is input/transmitted to the subtraction processing section 42d.

The subtraction processing section 42d subtracts the BPF processed (band-pass-filtered or post processed) relative vertical displacement (z2−z0) between the sprung mass and the road surface from the BPF processed (band-pass-filtered or post processed) sprung mass displacement (z2) so as to obtain/generate time series data of the road surface vertical displacement z0 (i.e., z0=z2−(z2−z0)). The thus obtained time series data of the road surface vertical displacement z0 is input/transmitted to the correlating processing section 42e.

The time series data of the position (position information) is also input/transmitted to the correlating processing section 42e. The correlating processing section 42e correlates the time series data of the road surface vertical displacement z0 with the position (position information), both having the common (same) detected time, and store them into the storing-data-base-section 44 (with maintaining the correlation between the road surface vertical displacement z0 with the position). Consequently, the road surface vertical displacement z0 and the position are stored in the storing-database-section 44 in such a manner that they are correlated/associated with each other.

Alternatively, the data processing section 42 may be configured to generate time series data of road surface vertical displacement rate dz0 and time series data of unsprung mass displacement rate dz1 by performing data processing (including at least of one of integration process being either a first order integration or a second order integration, a filtering process, and a derivative/differential process) for "the sensing data or the generated time series data of the road surface vertical displacement z0" and "the generated time series data of the unsprung mass displacement z1" in the offline processing manner.

In the above embodiment, the data collecting apparatus 20 may comprise an unillustrated acceleration sensor (unsprung mass acceleration sensor) configured to detect an acceleration of an unsprung mass. In this case, the cloud 40 performs the offline processing (including the second order integration and the BPF processing) to process time series data of the unsprung mass acceleration detected by the unsprung mass acceleration sensor so as to generate the time series data of the unsprung mass displacement z1. Alternatively, the cloud 40 may perform the offline processing (including the first order integration and the BPF processing) to process the time series data of the unsprung mass acceleration detected by the unsprung mass acceleration sensor so as to generate the time series data of unsprung mass displacement z1.

In addition, for example, the preview sensor 35 may be configured to detect the road surface vertical displacement z0. In this case, the cloud 40 may perform the offline processing (including BPF processing) to process time series data of the road surface vertical displacement z0 detected by the preview sensor 35 so as to generate the time series data of the road surface vertical displacement z0. Alternatively, the cloud 40 may perform the offline processing (including the derivative processing and the BPF processing) to process the time series data of the road surface vertical displacement z0 detected by the preview sensor 35 so as to generate the time series data of road surface vertical displacement rate dz0.

Furthermore, the cloud 40 may be configured to perform an off line process using an observer to generate (extrapolate) at least one of the time series data of the unsprung mass displacement z1, the time series data of the unsprung mass displacement rate dz1, the time series data of the road surface vertical displacement z0, and the time series data of the road surface vertical displacement rate dz0, based on at least one of the time series data of the sensor values that include:

the vertical direction acceleration of the sprung mass detected by each of the vertical direction acceleration sensors 31FL-31RR;
the relative vertical displacement between the sprung mass and an unsprung mass detected by each of the stroke sensors 32FR-32RR;
the relative vertical direction displacement between the vehicle body 10a (i.e., the sprung mass) and the road surface detected by the preview sensor 35;
the road surface vertical displacement detected by the preview sensor 35; and
the unsprung mass displacement acceleration detected by the unsprung mass acceleration sensor.

The second order integral processing section 42a may be implemented by a high-order integrator (e.g., a high-order integrator using fourth-order Euler method). The real time processing does not allow a large computational load, however, the offline processing does not have such a limitation in terms of the computational load. Therefore, in the present disclosure, the high-order integrator using the fourth-order Euler method can be utilized to decrease the integral error.

A data processing apparatus having an equivalent function to the cloud 40 may be installed on the vehicle 10, and the data processing apparatus may perform the offline processing of the sensing data.

The wheels 11 have the respective wheel actuators 17FR to 17RR in the above embodiment, however, at least one of the wheels 11 may be equipped with the wheel actuator 17.

In the above embodiment and the modifications, the wheel actuator 17 is used as a control force generating device, however, the control force generating device is not limited to the wheel actuator 17 as long as the control force generating device is configured to generate a control force acting vertically so as to damp/control the vibration of the sprung mass 151.

The control force generating device may be an active stabilizer device (not shown), that includes a front wheel active stabilizer device and a rear wheel active stabilizer device. The front wheel active stabilizer device is configured to generate a vertical control force (i.e., a front left wheel control force) in one of (vertical) directions between the sprung mass 151 corresponding to the front left wheel 11FL and the unsprung mass 150 corresponding to the front left wheel 11FL and to generate a vertical control force (i.e., a front right wheel control force) in the other one of the directions between the sprung mass 151 corresponding to the front right wheel 11FR and the unsprung mass 150 corresponding to the front right wheel 11FR. The rear wheel active stabilizer device is configured to generate a vertical control force (i.e., a rear left wheel control force) in one of vertical directions between the sprung mass 151 corresponding to the rear left wheel 11RL and the unsprung mass 150 corresponding to the rear left wheel 11RL and to generate a vertical control force (i.e., a rear right wheel control force) in the other one of the directions between the sprung mass 151 corresponding to the rear right wheel 11RR and the unsprung mass 150 corresponding to the rear right wheel 11RR. The thus configured active stabilizer device is well-known, and is disclosed in, for example, Japanese Patent Application Laid-Open No. 2009-96366 that is hereby incorporated by reference. It should be noted that the active stabilizer device may include at least one of the front wheel active stabilizer device and the rear wheel active stabilizer device.

The control force generating device may be a device configured to generate the vertical control force by increasing and decreasing a braking force or a driving force applied to the wheel 11 of the vehicle 10 with utilizing a geometry of the suspensions 13FL-13FR. This type of control force generating device is well-known, and is disclosed in, for example, Japanese Patent Application Laid-Open No. 2016-107778 that is hereby incorporated by reference. When this device is employed, the ECU 130 calculates the braking force or the driving force to generate the control force corresponding to the target control force.

In addition, this type of device may include a drive device (e.g., an in-wheel motor) for applying the driving force to each of the wheel 11 and a brake device for applying the braking force to each of the wheel 11. In this case, the drive device may be a motor and/or an engine that can apply the driving force to either one of or both of the front wheels and the rear wheels. Furthermore, the control force generating device may include at least one of the drive device and the brake device.

The shock absorbers 15FL to 15RR may be replaced with the variable damping force shock absorbers so as to be the control force generating device. In this case, the ECU 130 controls a damping coefficient C of each of the absorbers in such a manner that the damping force of the each of the absorbers varies depending on the target control force.

What is claimed is:

1. A data processing apparatus comprising:
a processing data storing device that stores data; and
a data processing device configured to:
obtain sensor values from information obtaining device mounted on a vehicle that acquires said sensor values, said sensor values being ones from which a road surface displacement correlating value correlating with a vertical displacement of a road surface on which said vehicle is traveling can be calculated;
store sensing data that is a set of said obtained sensor values and time series data in said processing data storing device;
perform specific offline data processing for a chunk of said sensing data stored in said processing data storing device so as to generate data of said road surface displacement correlating value; and cause wheel actuators to generate a force based on the road surface displacement correlating value, wherein the data processing apparatus further comprises a data accumulating device that stores data other than said sensing data;

said data processing device is configured to obtain said sensor values from said information obtaining device through a communication link;

said road surface displacement correlating value is an unsprung mass displacement representing a vertical displacement of an unsprung mass of said vehicle;

said sensor values are a vertical direction acceleration of a sprung mass of said vehicle and a relative vertical displacement between said sprung mass and said unsprung mass; and said specific offline data processing includes:
- a process for second-order-integrating said vertical direction acceleration of said sprung mass so as to generate data of a sprung mass displacement representing a vertical displacement of said sprung mass;
- a first band pass filtering process for filtering to allow components of said generated data of said sprung mass displacement having frequencies within a particular frequency band to pass through so as to generate post processed sprung mass displacement data;
- a second band pass filtering process for filtering to allow components of data of said relative vertical displacement between said sprung mass and said unsprung mass having frequencies within said particular frequency band to pass through so as to generate post processed relative vertical displacement data; and
- a process for obtaining said unsprung mass displacement by subtracting said generated post processed relative vertical displacement data from said generated post processed sprung mass displacement data, wherein filtering property of said first band pass filtering process is the same as filtering property of said second band pass filtering process;

said particular frequency band is equal to or higher than a first cut off frequency of said filtering property and is equal to or lower than a second cut off frequency of said filtering property; and said first cut off frequency has been set at a frequency that is lower than a sprung mass resonance frequency, and said second cut off frequency has been set at a frequency that is higher than said sprung mass resonance frequency.

2. The data processing apparatus of claim 1, wherein the first band pass filtering process and the second band pass filtering process are implemented by a zero-phase filtering process by executing band pass filtering in a time forward direction for the input time series data of the sprung mass displacement, executing a band pass filtering in a time backward direction for the input time series data of the sprung mass displacement, and averaging the filtered results.

* * * * *